(12) United States Patent
Boek et al.

(10) Patent No.: US 11,472,730 B2
(45) Date of Patent: Oct. 18, 2022

(54) LAMINATED GLASS ARTICLE WITH TINTED LAYER

(71) Applicant: CORNING INCORPORATED, Corning, NY (US)

(72) Inventors: Heather Debra Boek, Corning, NY (US); Matthew John Dejneka, Corning, NY (US); Lisa Ann Tietz Moore, Corning, NY (US)

(73) Assignee: Corning Incorporated, Corning, NY (US)

( * ) Notice: Subject to any disclaimer, the term of this patent is extended or adjusted under 35 U.S.C. 154(b) by 65 days.

(21) Appl. No.: 15/578,147

(22) PCT Filed: Jun. 1, 2016

(86) PCT No.: PCT/US2016/035240
§ 371 (c)(1),
(2) Date: Nov. 29, 2017

(87) PCT Pub. No.: WO2016/196615
PCT Pub. Date: Dec. 8, 2016

(65) Prior Publication Data
US 2018/0162768 A1    Jun. 14, 2018

Related U.S. Application Data

(60) Provisional application No. 62/169,840, filed on Jun. 2, 2015.

(51) Int. Cl.
*B32B 15/04*    (2006.01)
*B32B 17/06*    (2006.01)
(Continued)

(52) U.S. Cl.
CPC .............. *C03C 3/097* (2013.01); *B32B 17/06* (2013.01); *C03B 17/02* (2013.01); *C03B 17/064* (2013.01);
(Continued)

(58) Field of Classification Search
CPC .................. C03C 4/02; B32B 17/06
(Continued)

(56) References Cited

U.S. PATENT DOCUMENTS 3,561,985 A    2/1971  Hagedorn et al.
3,673,049 A *  6/1972  Giffen ................... C03C 3/087
                                                     428/213
(Continued)

FOREIGN PATENT DOCUMENTS

CN    104271523 A    1/2015
CN    104475982 A    4/2015
(Continued)

OTHER PUBLICATIONS

International Search Report and Written Opinion of the International Searching Authority; PCT/US2016/035240; dated Sep. 15, 2016; 15 Pages; European Patent Office.
(Continued)

*Primary Examiner* — Lauren R Colgan

(57) ABSTRACT

A laminated glass article includes a glass core layer and a glass cladding layer adjacent to the glass core layer. At least one of the glass core layer or the glass cladding layer is a tinted layer. The tinted layer can include a tinting agent that imparts a color to the tinted layer.

9 Claims, 2 Drawing Sheets

(51) Int. Cl.
*C03C 3/097* (2006.01)
*C03C 3/091* (2006.01)
*C03C 3/093* (2006.01)
*C03C 4/02* (2006.01)
*C03C 17/02* (2006.01)
*C03C 3/085* (2006.01)
*C03C 3/095* (2006.01)
*C03C 3/087* (2006.01)
*C03B 17/06* (2006.01)
*C03B 17/02* (2006.01)
*C03C 4/12* (2006.01)
*C03C 4/18* (2006.01)

(52) U.S. Cl.
CPC .............. *C03C 3/085* (2013.01); *C03C 3/087* (2013.01); *C03C 3/091* (2013.01); *C03C 3/093* (2013.01); *C03C 3/095* (2013.01); *C03C 4/02* (2013.01); *C03C 4/12* (2013.01); *C03C 4/18* (2013.01); *C03C 17/02* (2013.01); *B32B 2307/308* (2013.01); *B32B 2307/4026* (2013.01); *C03C 2204/00* (2013.01)

(58) Field of Classification Search
USPC ......................................... 428/426, 428, 432
See application file for complete search history.

(56) References Cited

U.S. PATENT DOCUMENTS

| | | | | |
|---|---|---|---|---|
| 3,849,097 A | * | 11/1974 | Giffen | C03C 17/02 65/33.5 |
| 4,130,680 A | * | 12/1978 | Ference | C03B 17/02 156/100 |
| 4,212,678 A | * | 7/1980 | Chyung | C03B 32/02 501/60 |
| 4,214,886 A | * | 7/1980 | Shay | C03B 17/02 65/121 |
| 4,405,672 A | | 9/1983 | Araujo et al. | |
| 5,070,044 A | | 12/1991 | Pinckney | |
| 6,566,626 B2 | | 5/2003 | Gaissinsky | |
| 8,413,466 B2 | | 4/2013 | Takaya et al. | |
| 9,023,744 B2 | | 5/2015 | Kawaguchi et al. | |
| 9,403,716 B2 | | 8/2016 | Dejneka et al. | |
| 9,512,030 B2 | * | 12/2016 | Mauro | C03C 3/089 |
| 9,701,570 B2 | * | 7/2017 | Mauro | C03C 4/005 |
| 2013/0136909 A1 | | 5/2013 | Mauro et al. | |
| 2014/0049708 A1 | | 2/2014 | Murata et al. | |
| 2014/0141217 A1 | * | 5/2014 | Gulati | C03C 3/091 428/212 |
| 2014/0242375 A1 | * | 8/2014 | Mauro | C03B 17/02 428/312.6 |
| 2014/0335331 A1 | * | 11/2014 | Ellison | C03C 3/097 428/212 |
| 2015/0010739 A1 | | 1/2015 | Mauro et al. | |
| 2015/0030827 A1 | * | 1/2015 | Gomez | C03C 21/002 428/212 |
| 2015/0037552 A1 | * | 2/2015 | Mauro | C03C 3/089 428/212 |
| 2015/0037553 A1 | * | 2/2015 | Mauro | C03C 3/091 428/217 |
| 2015/0051061 A1 | * | 2/2015 | Kiczenski | C03C 3/091 501/37 |
| 2015/0099130 A1 | | 4/2015 | Mauro et al. | |
| 2015/0251383 A1 | * | 9/2015 | Beall | C03B 17/02 428/428 |
| 2015/0291468 A1 | * | 10/2015 | Boek | C03B 17/02 428/410 |
| 2015/0375475 A1 | * | 12/2015 | Cook | C03C 3/091 65/60.5 |
| 2017/0129218 A1 | | 5/2017 | Cleary et al. | |
| 2017/0226000 A1 | * | 8/2017 | Kiczenski | C03C 3/093 |

FOREIGN PATENT DOCUMENTS

| | | |
|---|---|---|
| EP | 0816296 A1 | 1/1998 |
| EP | 1599426 B1 | 7/2008 |
| EP | 1985591 A1 | 10/2008 |
| JP | 60131846 A | 7/1985 |
| JP | 04-275948 A | 10/1992 |
| JP | 10194790 A | 7/1998 |
| JP | 2000001331 A | 1/2000 |
| JP | 2002003240 A | 1/2002 |
| JP | 2007308330 A | 11/2007 |
| JP | 2008-273826 A | 11/2008 |
| JP | 2011093728 A | 5/2011 |
| WO | 2007016126 A1 | 2/2007 |
| WO | 2012112279 A1 | 8/2012 |
| WO | 2013058384 A1 | 4/2013 |
| WO | 2013/082225 A2 | 6/2013 |
| WO | 2013130665 A2 | 9/2013 |
| WO | 2014013242 A1 | 1/2014 |
| WO | 2014134098 A1 | 9/2014 |
| WO | WO2014160534 | * 10/2014 |
| WO | 2015023561 A2 | 2/2015 |

OTHER PUBLICATIONS

Chinese Patent Application No. 201680044414.1; English Translation of the First Office Action dated Mar. 20, 2020; China Patent Office; 10 pgs.
English Translation of JP2017563085 Office Action ated Jul. 8, 2020; 4 Pages; Japanese Patent Office.
Japanese Patent Application No. 2017-563085; Office Action dated Jan. 6, 2021; 10 Pages; Japanese Patent Office.
Chinese Patent Application No. 201680044414.1, Office Action dated Feb. 1, 2021; 8 pages (English Translation Only); Chinese Patent Office.

* cited by examiner

LAMINATED GLASS ARTICLE WITH TINTED LAYER

This application is a national stage entry of International Patent Application Serial No. PCT/US16/35240 filed on Jun. 1, 2016, which claims the benefit of priority under 35 U.S.C. § 119 to U.S. Provisional Application No. 62/169,840 filed on Jun. 2, 2015, the content of which is incorporated herein by reference in its entirety.

BACKGROUND

1. Field

This disclosure relates to glass articles, and more particularly to laminated glass articles comprising a plurality of glass layers.

2. Technical Background

A variety of different materials can be added to a glass sheet to impart a desired tint or color to the glass sheet.

SUMMARY

Disclosed herein are laminated glass articles.

Disclosed herein is a laminated glass article comprising a glass core layer and a glass cladding layer adjacent to the glass core layer. At least one of the glass core layer or the glass cladding layer comprises a tinted layer. The tinted layer can comprise a tinting agent that imparts a color to the tinted layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
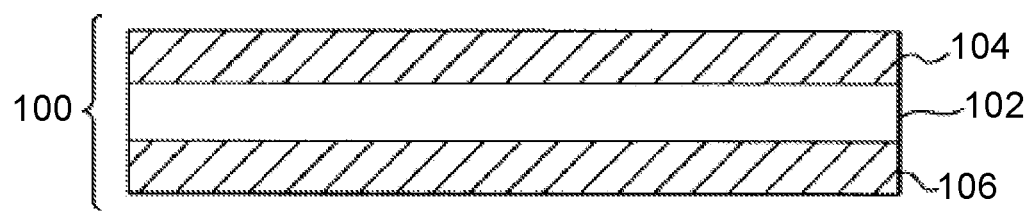
FIG. 1 is a cross-sectional view of one exemplary embodiment of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion," or "average CTE" refers to the average coefficient of thermal expansion of a given material or layer between 0° C. and 300° C. As used herein, the term "coefficient of thermal expansion," or "CTE" refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

Concentrations of various components of glass compositions described herein are expressed in terms of mol % on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated.

In various embodiments, a glass article comprises at least a first layer and a second layer. For example, the first layer comprises a core layer, and the second layer comprises one or more cladding layers adjacent to the core layer. At least one layer of the glass article comprises a tinted layer. The tinted layer comprises one or more tinting agents configured to impart a tint or color to the tinted layer. The first layer and/or the second layer are glass layers comprising a glass, a glass-ceramic, or a combination thereof. In some embodiments, the first layer and/or the second layer are transparent glass layers. For example, the first layer and/or the second layer comprises an average transmittance of at least about 70%, at least about 75%, at least about 80%, at least about 85%, at least about 90%, at least about 95%, at least about 98%, or at least about 99% over a wavelength range of about 400 nm to about 750 nm. In some embodiments, the first layer and/or the second layer comprise opal glass that is translucent or opaque. The glass article can comprise a glass sheet or a shaped glass article comprising a suitable 3-dimensional (3D) shape. In some embodiments, an average coefficient of thermal expansion (CTE) of the first layer is greater than an average CTE of the second layer. Such a CTE mismatch can aid in strengthening the glass article.

FIG. 1 is a cross-sectional view of one exemplary embodiment of a glass article 100. In some embodiments, glass article 100 comprises a laminated sheet comprising a plurality of glass layers. The laminated sheet can be substantially planar as shown in FIG. 1 or non-planar. In other embodiments, the glass article comprises a shaped glass article. For example, the laminated sheet is contacted with a forming surface of a mold to form the shaped glass article. Glass article 100 comprises a first layer and a second layer. In the embodiment shown in FIG. 1, the first layer comprises a core layer 102, and the second layer comprises a first cladding layer 104 and a second cladding layer 106. Core layer 102 is disposed between first cladding layer 104 and second cladding layer 106. In some embodiments, first cladding layer 104 and second cladding layer 106 are exterior layers as shown in FIG. 1. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, the interfaces between first cladding layer 104 and core layer 102 and/or between second cladding layer 106 and core layer 102 are free of any bonding material such as, for example, a polymer interlayer, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass article comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer adjacent to the diffusion layer. Thus, two directly adjacent glass layers are fused at the diffusion layer. In some embodiments, glass article 100 comprises a glass-glass laminate (e.g., an in situ fused multilayer glass-glass laminate) in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

Figure 2:
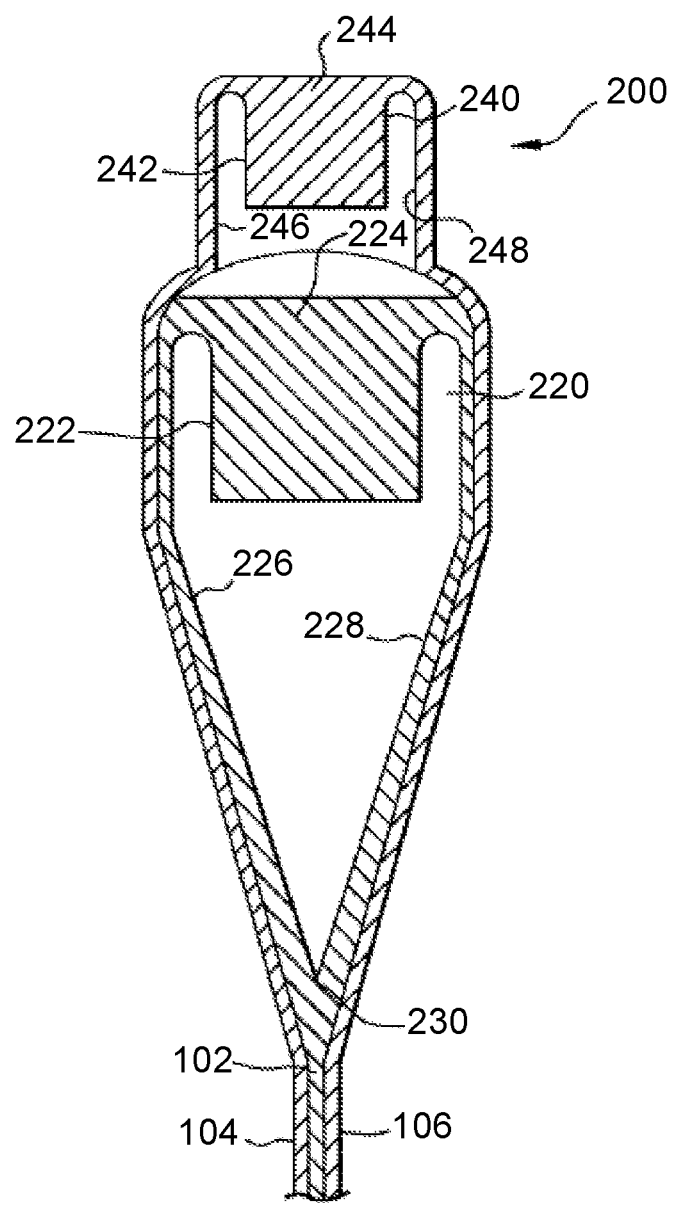
FIG. 2 is a cross-sectional view of one exemplary embodiment of an overflow distributor that can be used to form a glass article.

The glass article can be formed using a suitable process such as, for example, a fusion draw, down draw, slot draw, up draw, or float process. The various layers of the glass article can be laminated during forming of the glass article or formed independently and subsequently laminated to form the glass article. In some embodiments, the glass article is formed using a fusion draw process. FIG. 2 is a cross-sectional view of one exemplary embodiment of an overflow distributor 200 that can be used to form a glass article such as, for example, glass article 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms core layer 102 of glass article 100 as further described below. Upper overflow distributor 240 comprises a trough 242. A second glass composition 244 is melted and fed into trough 242 in a viscous state. Second glass composition 244 forms first and second cladding layers 104 and 106 of glass article 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass article 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass article 100.

In some embodiments, first glass composition 224 of core layer 102 in the viscous state is contacted with second glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass article 100 comprises the laminated sheet as shown in FIG. 1. In other embodiments, the laminated sheet can be processed further (e.g., by cutting or molding) to form glass article 100.

Although glass article 100 shown in FIG. 1 comprises three layers, other embodiments are included in this disclosure. In other embodiments, a glass article can have a determined number of layers, such as two, four, or more layers. For example, a glass article comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass article comprising four or more layers can be formed using additional overflow distributors and/or using overflow distributors with divided troughs. Thus, a glass article having a determined number of layers can be formed by modifying the overflow distributor accordingly.

In some embodiments, at least one of core layer 102, first cladding layer 104, or second cladding layer 106 comprises a tinted layer. For example, the tinted layer comprises an absorbance delta (e.g., a difference between a maximum absorbance and a minimum absorbance) of at least about 1%, at least about 2%, at least about 3%, at least about 4%, or at least about 5% over a wavelength range of about 400 nm to about 750 nm. Thus, the tinted layer comprises an absorbance peak falling within the visible wavelength spectrum that imparts a tint or color to the tinted layer. For example, the first glass composition comprises a tinting agent such that core layer 102 comprises the tinted layer. Additionally, or alternatively, the second glass composition comprises a tinting agent such that first cladding layer 104 and/or second cladding layer 106 comprises the tinted layer. In some embodiments, the first cladding layer and the second cladding layer comprise different glass compositions as described herein. In some of such embodiments, one or both of the second glass composition or the third glass composition comprises a tinting agent such that the corresponding first cladding layer and/or second cladding layer comprises the tinted layer. For example, the first cladding layer and the second cladding layer can comprise the same or a different tinting agent such that the first cladding layer and the second cladding layer have the same or a different tint or color.

In some embodiments, more than one layer of the glass article comprises a tinting agent. For example, core layer 102 and at least one of first cladding layer 104 or second cladding layer 106 comprise a tinting agent. In some of such embodiments, the tinting agent of core layer 102 and the tinting agent of cladding layer 104 and/or cladding layer 106 are different from each other. Thus, core layer 102 comprises a different tint or color than first cladding layer 104 and/or second cladding layer 106. In such embodiments, the glass article 100 comprises a tint or color that is a combination of the tint or color of core layer 102 and the different tint or color of first cladding layer 104 and/or second cladding layer 106. Thus, different tinting agents in different layers of the glass article can be used to give the glass article a desired tint or color.

In some embodiments, the tinting agent comprises a transition metal. For example, the transition metal is selected from the group consisting of Ti, V, Cr, Mn, Fe, Co, Ni, Cu, Zn, Au, Ag, Pt, Ni, Mo, W, and combinations thereof. Additionally, or alternatively, the tinting agent comprises a redox agent. For example, the redox agent is selected from the group consisting of Sn, Ce, Sb, As, Fe, C, Bi, and combinations thereof. The redox agent can help to control the ratio of different oxidation state concentrations of the transition metal, thereby controlling the color of the tinted layer. For example, in some embodiments, the transition metal comprises Fe and the redox agent comprises a reducing agent. The reducing agent controls the ratio of $Fe^{2+}$ to $Fe^{3+}$ which, in turn, determines the color of the tinted layer. For example, in embodiments in which the transition metal comprises Fe and the redox agent comprises Sn, one or both of the following reactions can take place within the tinted layer to control the color thereof:

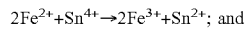

$$2Fe^{2+}+Sn^{4+} \rightarrow 2Fe^{3+}+Sn^{2+}; \text{ and}$$

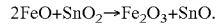

$$2FeO+SnO_2 \rightarrow Fe_2O_3+SnO.$$

Additionally, or alternatively, the tinting agent comprises at least one of a phosphorescent material or a fluorescent material. For example, the transition metal, with or without the redox agent, can have phosphorescent and/or fluorescent properties.

In some embodiments, the tinting agent comprises a rare earth element. For example, the rare earth element is selected from the group consisting of Ce, Pr, Nd, Sm, Eu, Gd, Tb, Dy, Ho, Er, Tm, Yb, Lu, U, and combinations thereof. Additionally, or alternatively, the tinting agent further comprises a redox agent. The redox agent can help to control the ratio of different oxidation state concentrations of the rare earth element, thereby controlling the color of the tinted layer. For example, in some embodiments, the rare earth element comprises Ce or Eu and the redox agent comprises a reducing agent. The reducing agent controls the ratio of $Ce^{4+}$ to $Ce^{3+}$ or the ratio of $Eu^{2+}$ to $Eu^{3+}$, which in turn, determines the color of the tinted layer. The rare earth elements Pr, Nd, Sm, Gd, Tb, Dy, Ho, Er, Tm, Yb, and Lu generally are trivalent in most silicate glasses and may not be affected by the presence of a redox agent. Additionally, or alternatively, the tinting agent comprises at least one of a phosphorescent material or a fluorescent material. For example, the rare earth element, with or without the redox agent, can have phosphorescent and/or fluorescent properties. For example $Eu^{3+}$ fluoresces red when exposed to UV light, while $Eu^{2+}$ fluoresces blue. Also for example, $Tb^{3+}$ fluoresces green, $Sm^{3+}$ fluoresces orange, and $Ce^{3+}$ fluoresces blue.

In some embodiments, the tinting agent is selected from the group consisting of Se, Cd, S, colloidal compounds thereof, and combinations thereof.

In some embodiments, the tinting agent comprises a colloidal metal. For example, the colloidal metal is selected from the group consisting of Cu, Au, Ag, Pt, Bi, and combinations thereof.

In some embodiments, the glass composition of one layer may be better suited to incorporate the tinting agent that the glass composition of another layer. Thus, the laminate structure of the glass article enables the tinting agent that will yield the desired color to be incorporated into the layer with the glass composition with which the tinting agent is most compatible.

In some embodiments, glass article 100 comprises a thickness of at least about 0.05 mm, at least about 0.1 mm, at least about 0.2 mm, or at least about 0.3 mm. Additionally, or alternatively, glass article 100 comprises a thickness of at most about 3 mm, at most about 2 mm, at most about 1.5 mm, at most about 1 mm, at most about 0.7 mm, or at most about 0.5 mm. For example, glass article comprises a thickness of from about 0.2 mm to about 3 mm, from about 1 mm to about 3 mm, or from about 1.5 mm to about 2.5 mm. In some embodiments, a ratio of a thickness of core layer 102 to a thickness of glass article 100 is at least about 0.7, at least about 0.8, at least about 0.85, at least about 0.9, or at least about 0.95. In some embodiments, a thickness of the second layer (e.g., each of first cladding layer 104 and second cladding layer 106) is from about 0.01 mm to about 0.3 mm.

In some embodiments, the cladding layer is thinner than the core layer. For example, each of the first cladding layer and the second cladding layer is thinner than the core layer disposed therebetween as described herein. In some of such embodiments, the first cladding layer and/or the second cladding layer comprise a tinting agent such that the respective cladding layer comprises the tinted layer. Confining the tinting agent to the relatively thin cladding layers can reduce the amount of tinting agent used to achieve the desired tint or color in the glass article. Additionally, or alternatively, a smaller glass melting apparatus (e.g., melting tank) can be used to form the glass material with the tinting agent for the relatively thin cladding layers, compared to the melting apparatus used to form the glass material of the core layer. Thus, a relatively smaller batch of glass material comprising the tinting agent can be used, and the time required to switch to a different glass material (e.g., comprising a different tinting agent) can be reduced.

In some embodiments, the first glass composition and/or the second glass composition comprise a liquidus viscosity suitable for forming glass article 100 using a fusion draw process as described herein. For example, the first glass composition of the first layer (e.g., core layer 102) comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of the second layer (e.g., first and/or second cladding layers 104 and 106) comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the second layer. Thus, the second glass composition can comprise a liquidus viscosity that is lower than generally considered suitable for forming a single layer sheet using a fusion draw process.

In some embodiments, the liquidus viscosity of one layer may be better suited to incorporate the tinting agent than the liquidus viscosity of another layer. Thus, the laminate structure of the glass article enables the tinting agent that will yield the desired color to be incorporated into the layer with the liquidus viscosity with which the tinting agent is most compatible.

In some embodiments, glass article 100 is configured as a strengthened glass article. For example, in some embodiments, the second glass composition of first and/or second cladding layers 104 and 106 comprises a different average coefficient of thermal expansion (CTE) than the first glass composition of core layer 102. For example, first and second cladding layers 104 and 106 are formed from a glass composition having a lower average CTE than core layer 102. The CTE mismatch (i.e., the difference between the average CTE of first and second cladding layers 104 and 106 and the average CTE of core layer 102) results in formation of compressive stress in the cladding layers and tensile stress in the core layer upon cooling of glass article 100. Such strengthening can be achieved without subjecting the glass article to a thermal strengthening (e.g., tempering) or chemical strengthening (e.g., ion exchange) process. Thus, strengthening the glass article by CTE mismatch as described herein can enable the use of tinting agents that are incompatible with thermal strengthening and/or chemical strengthening processes. In various embodiments, each of the first and second cladding layers, independently, can have a higher average CTE, a lower average CTE, or substantially the same average CTE as the core layer.

In some embodiments, the average CTE of core layer 102 and the average CTE of first and/or second cladding layers 104 and 106 differ by at least about $5 \times 10^{-7}$ C.$^{-1}$, at least about $15 \times 10^{-7}$ C.$^{-1}$, at least about $25 \times 10^{-7}$ C.$^{-1}$, or at least about $30 \times 10^{-7}$ C.$^{-1}$. Additionally, or alternatively, the average CTE of core layer 102 and the average CTE of first and/or second cladding layers 104 and 106 differ by at most about $100 \times 10^{-7}$ C.$^{-1}$, at most about $75 \times 10^{-7}$ C.$^{-1}$, at most about $50 \times 10^{-7}$ C.$^{-1}$, at most about $40 \times 10^{-7}$ C.$^{-1}$, at most about $30 \times 10^{-7}$ C.$^{-1}$, at most about $20 \times 10^{-7}$ C.$^{-1}$, or at most about $10 \times 10^{-7}$ C.$^{-1}$. In some embodiments, the second glass composition of first and/or second cladding layers 104 and 106 comprises an average CTE of at most about $66 \times 10^{-7}$ C.$^{-1}$, at most about $55 \times 10^{-7}$ C.$^{-1}$, at most about $50 \times 10^{-7}$ C.$^{-1}$, at most about $40 \times 10^{-7}$ C.$^{-1}$, or at most about $35 \times 10^{-7}$ C.$^{-1}$. Additionally, or alternatively, the second glass composition of first and/or second cladding layers 104 and 106 comprises an average CTE of at least about $25 \times 10^{-7}$ C.$^{-1}$, or at least about $30 \times 10^{-7}$ C.$^{-1}$. Additionally, or alternatively, the first glass composition of core layer 102 comprises an average CTE of at least about $40 \times 10^{-7}$ C.$^{-1}$, at least about $50 \times 10^{-7}$ C.$^{-1}$, at least about $55 \times 10^{-7}$ C.$^{-1}$, at least about $65 \times 10^{-7}$ C.$^{-1}$, at least about $70 \times 10^{-7}$ C.$^{-1}$, at least about $80 \times 10^{-7}$ C.$^{-1}$, or at least about $90 \times 10^{-7}$ C.$^{-1}$. Additionally, or alternatively, the first glass composition of core layer 102 comprises an average CTE of at most about $110 \times 10^{-7}$ C.$^{-1}$, at most about $100 \times 10^{-7}$ C.$^{-1}$, at most about $90 \times 10^{-7}$ C.$^{-1}$, at most about $75 \times 10^{-7}$ C.$^{-1}$, or at most about $70 \times 10^{-7}$ C.$^{-1}$.

In some embodiments, one or more layers of the glass article comprise an ion exchangeable glass composition. For example, first cladding layer 104 and/or second cladding layer 106 comprise an ion exchangeable glass composition such that the glass article can be further strengthened (e.g., to achieve a surface compressive stress greater than that achieved by CTE mismatch) after formation thereof. Exemplary ion exchangeable glass compositions suitable for use in the cladding layers include, but are not limited to, those described in U.S. Patent Application Pub. No. 2015/0030827, which is incorporated herein by reference in its entirety. For example, in some embodiments, the first cladding layer and/or the second cladding layer comprises an alkali metal. The core layer can comprise an alkali metal or can be substantially free (e.g., comprise less than about 0.1 mol %) or free of alkali metal. Additionally, or alternatively, core layer 102 comprises an ion exchangeable glass composition such that the glass article can be further strengthened (e.g., to achieve an increased compressive stress at the core/clad interface by ion exchange between adjacent layers of the glass article and/or to achieve a surface compressive stress at an exposed portion of the core layer along an edge of the glass article) after formation thereof. Exemplary ion exchangeable glass compositions suitable for use in the core layer include, but are not limited to, Corning® Gorilla® Glass compositions. For example, in some embodiments, the core layer comprises an alkali metal. The cladding layer can comprise an alkali metal or can be substantially free (e.g., comprise less than about 0.1 mol %) or free of alkali metal.

In some embodiments, the tint or color generated by the tinting agent can be affected by subjecting the glass article to an ion exchange process. For example, in embodiments in which first cladding layer 104 and/or second cladding layer 106 comprise the tinting agent, glass article 100 can be subjected to an ion exchange process to generate the desired color (e.g., by changing the behavior of the tinting agent present in the cladding layer). Additionally, or alternatively, core layer 102 comprises the tinting agent such that glass article 100 can be subjected to the ion exchange process (e.g., to further strengthen first cladding layer 104 and/or second cladding layer 106) without substantially changing the tint or color generated by the tinting agent. Thus, the cladding layers protect the core layer during the ion exchange process so that the tinting agent is not substantially affected by the ion exchange process.

In some embodiments, the glass article is textured. For example, the glass article is tinted and textured. As used herein a "textured" glass article comprises a surface roughness, given in μ-inch, of at least about 400 Ra, such as at least about 410 Ra, at least about 420 Ra, at least about 430 Ra, at least about 440 Ra, at least about 450 Ra, at least about 460 Ra, at least about 470 Ra, at least about 480 Ra, at least about 490 Ra, or at least about 500 Ra. Conversely, a "non-textured" or "smooth" glass article comprises a surface roughness of less than about 125 Ra, such as less than about 120 Ra, less than about 115 Ra, or less than about 110 Ra. For example, one or both of first cladding layer 104 or second cladding layer 106 of glass article 100 may be partially or completely textured (e.g., by passing the glass article between one or more textured rollers during forming or in a secondary texturing process). In various embodiments, a textured glass article may be formed by a method including: drawing a glass laminate (e.g., from an overflow distributor, a slot draw apparatus, a float bath, or another glass forming apparatus) including a glass core layer and at least one glass cladding layer thermally fused to the core layer; texturing the glass laminate by rolling a textured roller along a first surface of the glass laminate (e.g., an outer surface of the cladding layer) while a portion of the glass laminate contacting the textured roller has a temperature between the softening points of the cladding layer and the core layer (e.g., as the glass laminate is drawn); and cutting the textured glass laminate to form a textured laminate glass article. One or more of the core and cladding layers of the glass laminate may include a tinted glass composition as described herein. For example, a textured glass laminate may include: a tinted core layer and colorless cladding layers; a tinted core layer, a colorless first cladding layer, and a tinted second cladding layer; a tinted core layer, a tinted first cladding layer, and a tinted second cladding layer; a colorless core layer, a tinted first cladding layer, and a colorless second cladding layer; or a colorless core layer and tinted first and second cladding layers. Accordingly, a textured glass laminate may include any of the above tinted and/or colorless layers to create different composite tints. In some embodiments the core layer may have a higher softening point than the cladding layer, but the present disclosure is not limited thereto. Such a difference in softening point may enable the relatively more viscous or harder core layer to maintain the shape and/or stability of the laminate glass article during texturing of the relatively less viscous or softer cladding layer(s).

In various embodiments, the relative thicknesses of the glass layers can be selected to achieve a glass article having desired strength properties. For example, in some embodiments, the first glass composition of core layer 102 and the second glass composition of first and/or second cladding layers 104 and 106 are selected to achieve a desired CTE mismatch, and the relative thicknesses of the glass layers are selected, in combination with the desired CTE mismatch, to achieve a desired compressive stress in the cladding layers and tensile stress in the core layer. Without wishing to be bound by any theory, it is believed that the strength profile of the glass article can be determined predominantly by the relative thicknesses of the glass layers and the compressive stress in the cladding layers, and that the breakage pattern of the glass article can be determined predominantly by the relative thicknesses of the glass layers and the tensile stress in the core layer. Thus, the glass compositions and relative thicknesses of the glass layers can be selected to achieve a glass article having a desired strength profile and/or breakage pattern. The glass article can have the desired strength profile and/or breakage pattern in an as-formed condition without additional processing (e.g., thermal tempering or ion-exchange treatment). For example, the as-formed glass sheet or shaped glass article can have an improved strength profile as compared to thermally tempered or ion-exchanged glass articles as described herein.

In some embodiments, the compressive stress of the cladding layers is at most about 800 MPa, at most about 500 MPa, at most about 350 MPa, or at most about 150 MPa. Additionally, or alternatively, the compressive stress of the cladding layers is at least about 10 MPa, at least about 20 MPa, at least about 30 MPa, at least about 50 MPa, or at least about 250 MPa. Additionally, or alternatively, the tensile stress of the core layer is at most about 150 MPa, or at most about 100 MPa. Additionally, or alternatively, the tensile stress of the core layer is at least about 5 MPa, at least about 10 MPa, at least about 25 MPa, or at least about 50 MPa.

In some embodiments, glass article 100 is configured as a durable glass article. For example, glass article 100 is resistant to degradation in response to exposure to a reagent. In some embodiments, the second glass composition of the first and/or second cladding layers 104 and 106 comprises a durable glass composition that is resistant to degradation in response to exposure to the reagent. In some embodiments, the glass article comprises a core enveloped within a cladding. For example, core layer 102 is enveloped within a cladding comprising first cladding layer 104 and second cladding layer 106 as shown in FIG. 1. In some of such embodiments, the first glass composition of core layer 102 comprises a non-durable glass composition that is non-resistant to degradation in response to exposure to the reagent. The durable cladding can aid in protecting the core from exposure to the reagent. In other embodiments, the first glass composition comprises a durable glass composition that is resistant to degradation in response to exposure to the reagent. Thus, because the core is enveloped within the cladding, the first glass composition of the core of the durable glass article can comprise a durable or non-durable glass composition. In some embodiments, the core layer comprises the tinted layer, which can be non-durable, and the cladding layer serves to protect the tinted layer. Additionally, or alternatively, the core layer comprises a volatile tinting agent (e.g., Cd, S, Se, or compounds thereof), and the cladding layer serves to prevent loss of the volatile tinting agent from the surface of the glass article. Additionally, or alternatively, the core layer comprises a tinting agent that is reactive with air (e.g., Cu), and the cladding layer serves to prevent contacting the tinting agent with air at the surface of the glass article.

In various embodiments, the reagent comprises an acid, a base, or a combination thereof. In some embodiments, the reagent comprises an acid such as, for example, a mineral acid (e.g., HCl, $HNO_3$, $H_2SO_4$, $H_3PO_4$, $H_3BO_3$, HBr, $HClO_4$, or HF), a carboxylic acid (e.g., $CH_3COOH$), or a combination thereof. For example, in some embodiments, the reagent comprises HCl (e.g., 5 vol % aqueous HCl solution). Additionally, or alternatively, the reagent comprises $HNO_3$ (e.g., 1 M aqueous $HNO_3$ solution). Additionally, or alternatively, the reagent comprises $H_2SO_4$ (e.g., 0.02 N aqueous $H_2SO_4$ solution). In some embodiments, the reagent comprises a base such as, for example, LiOH, NaOH, KOH, RbOH, CsOH, $Ca(OH)_2$, $Sr(OH)_2$, $Ba(OH)_2$, or a combination thereof. In some embodiments, the reagent comprises a soap (e.g., potassium oleate), kerosene, an alcohol (e.g., undiluted denatured alcohol such as Formula SD No. 30, methyl alcohol, ethyl alcohol, and/or isopropanol), gasoline, an ether (e.g., a glycol ether such as glycol monomethyl ether), ammonia (e.g., ammonium hydroxide), water, or combinations thereof.

The chemical durability of a glass composition can be represented by a degradation rate of the glass composition in response to exposure to a reagent at a particular temperature for a particular period of time. The degradation rate can be expressed, for example, as mass of the sample lost per surface area of the sample. In some embodiments, a degradation rate of the second glass composition of first and/or second cladding layers 104 and 106 in response to exposure to a 5 vol % aqueous HCl solution at 95° C. for 6 h is at most about 0.018 $mg/cm^2$, at most about 0.009 $mg/cm^2$, or at most about 0.005 $mg/cm^2$. Additionally, or alternatively, a degradation rate of the second glass composition of first and/or second cladding layers 104 and 106 in response to exposure to a 1 M aqueous $HNO_3$ solution at 95° C. for 24 h is at most about 0.08 $mg/cm^2$, at most about 0.06 $mg/cm^2$, or at most about 0.03 mg/cm$^2$. Additionally, or alternatively, a degradation rate of the second glass composition of first and/or second cladding layers 104 and 106 in response to exposure to a 0.02 N aqueous H$_2$SO$_4$ solution at 95° C. for 24 h is at most about 0.04 mg/cm$^2$, at most about 0.02 mg/cm$^2$, or at most about 0.005 mg/cm$^2$. In other embodiments, chemical durability of a glass composition is determined as described in ANSI Z26.1, Test 19; RECE R43, Test A3/6; ISO 695; ISO 720; DIN 12116; each of which is incorporated by reference herein in its entirety; or a similar standard.

In various embodiments, a glass article can be used in applications in which strength and/or chemical durability are beneficial. For example, chemical durability can be beneficial for applications in which the glass will be used outdoors (e.g., automotive glass or architectural glass) or for other applications in which the glass article is likely to come into contact with potentially corrosive reagents such as acids or bases (e.g., laboratory benchtops). Strength can be beneficial in these same applications to avoid breakage of the glass article.

In some embodiments, an automotive glazing comprises glass article 100. The automotive glazing can include, for example, a windshield, a sidelite (e.g., a door glass or a quarter window), a sun roof, a moon roof, a rear backlite, a lighting cover (e.g., for headlights, taillights, turn signals, or fog lights), a mirror (e.g., a side mirror or a rearview mirror), an instrument panel or gauge cover, an interior or exterior panel (e.g., for a pillar or other applique), or another suitable glass or window.

In some embodiments, a display (e.g., an LED or LCD display) comprises glass article 100. For example, the display comprises a cover glass comprising glass article 100. In some embodiments, the cover glass comprises an integrated cover glass and color filter. In some embodiments, the cover glass comprises an integrated touch cover glass.

In some embodiments, an architectural panel comprises glass article 100.

The first glass composition of core layer 102 and the second glass composition of first and/or second cladding layers 104 and 106 can comprise suitable glass compositions capable of forming a glass article with desired properties as described herein. Exemplary glass compositions and selected properties of the exemplary glass compositions can include those described in International Patent Application No. PCT/US2015/029671, which is incorporated by reference herein in its entirety. Some of such examples are shown in Table 1. The amounts of the various components are given in Table 1 as mol % on an oxide basis. The chemical durability of such compositions can be determined using the following procedure. A glass sample with a width of about 2.5 cm and a length of about 2.5 cm is soaked in Opticlear at 40° C. and rinsed with IPA. The glass sample is wiped with cheese cloth while rinsing with deionized water and then dried at 140° C. for at least 30 minutes. 200 mL of an aqueous reagent solution is added to a preleached 250 ml FEP bottle and preheated for about 1-2 hours in an oven set at 95° C. The glass sample is leaned upright against the side wall of the bottle and allowed to soak for a predetermined time at a predetermined temperature. About 15 mL of the resulting solution is poured into a centrifuge tube and reserved for ICP. The remainder of the solution is disposed of and the glass sample, still remaining in the bottle, is immediately quenched in deionized water. After quenching, the glass sample is retrieved from the bottle, rinsed in deionized water, and dried at 140° C. for at least 30 minutes. The weight loss of the glass sample is measured and the chemical durability is determined as weight loss per unit surface area.

In various embodiments, a glass article comprises a first layer (e.g., a core layer) comprising one of the exemplary glass compositions and a second layer (e.g., one or more cladding layers) comprising another of the exemplary glass compositions. The glass compositions of the first layer and the second layer are selected such that the glass article comprises strength and/or chemical durability properties as described herein. For example, the glass compositions of the first layer and the second layer are selected such that the glass article comprises a desired CTE mismatch. Additionally, or alternatively, the glass composition of the second layer is selected such that the glass article comprises a desired chemical durability.

In some embodiments, the first glass composition comprises a glass network former selected from the group consisting of SiO$_2$, Al$_2$O$_3$, B$_2$O$_3$, P$_2$O$_5$, and combinations thereof. For example, the first glass composition comprises at least about 45 mol % SiO$_2$, at least about 50 mol % SiO$_2$, at least about 60 mol % SiO$_2$, at least about 70 mol % SiO$_2$, or at least about 75 mol % SiO$_2$. Additionally, or alternatively, the first glass composition comprises at most about 85 mol % SiO$_2$, at most about 80 mol % SiO$_2$, at most about 75 mol % SiO$_2$, at most about 60 mol % SiO$_2$, or at most about 50 mol % SiO$_2$. Additionally, or alternatively, the first glass composition comprises at least about 2 mol % Al$_2$O$_3$, at least about 5 mol % Al$_2$O$_3$, at least about 9 mol % Al$_2$O$_3$, at least about 15 mol % Al$_2$O$_3$, or at least about 20 mol % Al$_2$O$_3$. Additionally, or alternatively, the first glass composition comprises at most about 25 mol % Al$_2$O$_3$, at most about 20 mol % Al$_2$O$_3$, at most about 15 mol % Al$_2$O$_3$, or at most about 10 mol % Al$_2$O$_3$. Additionally, or alternatively, the first glass composition comprises at least about 1 mol % B$_2$O$_3$, at least about 4 mol % B$_2$O$_3$, or at least about 7 mol % B$_2$O$_3$. Additionally, or alternatively, the first glass composition comprises at most about 10 mol % B$_2$O$_3$, at most about 8 mol % B$_2$O$_3$, or at most about 5 mol % B$_2$O$_3$. Additionally, or alternatively, the first glass composition comprises at least about 0.01 mol % P$_2$O$_5$, at least about 0.1 mol % P$_2$O$_5$, or at least about 2 mol % P$_2$O$_5$. Additionally, or alternatively, the first glass composition comprises at most about 5 mol % P$_2$O$_5$ or at most about 1 mol % P$_2$O$_5$.

In some embodiments, the first glass composition comprises an alkali metal oxide selected from the group consisting of Li$_2$O, Na$_2$O, K$_2$O, and combinations thereof. For example, the first glass composition comprises at least about 5 mol % Na$_2$O, at least about 9 mol % Na$_2$O, or at least about 12 mol % Na$_2$O. Additionally, or alternatively, the first glass composition comprises at most about 20 mol % Na$_2$O, at most about 16 mol % Na$_2$O, or at most about 13 mol % Na$_2$O. Additionally, or alternatively, the first glass composition comprises at least about 0.01 mol % K$_2$O, at least about 1 mol % K$_2$O, at least about 2 mol % K$_2$O, or at least about 3 mol % K$_2$O. Additionally, or alternatively, the first glass composition comprises at most about 6 mol % K$_2$O, at most about 5 mol % K$_2$O, at most about 4 mol % K$_2$O, at most about 3 mol % K$_2$O, or at most about 1 mol % K$_2$O. Additionally, or alternatively, the first glass composition comprises at least about 5 mol % Li$_2$O, at least about 8 mol % Li$_2$O, or at least about 10 mol % Li$_2$O. Additionally, or alternatively, the first glass composition comprises at most about 15 mol % Li$_2$O, at most about 12 mol % Li$_2$O, or at most about 10 mol % Li$_2$O.

In some embodiments, the first glass composition comprises an alkaline earth oxide selected from the group consisting of MgO, CaO, SrO, BaO, and combinations thereof.

In some embodiments, the first glass composition comprises one or more additional components including, for example $SnO_2$, $Sb_2O_3$, $As_2O_3$, $Ce_2O_3$, Cl (e.g., derived from KCl or NaCl), Br, F, $ZrO_2$, or $Fe_2O_3$.

In some embodiments, the second glass composition comprises a glass network former selected from the group consisting of $SiO_2$, $Al_2O_3$, $B_2O_3$, and combinations thereof. For example, the second glass composition comprises at least about 65 mol % $SiO_2$, at least about 68 mol % $SiO_2$, at least about 70 mol % $SiO_2$, or at least about 75 mol % $SiO_2$. Additionally, or alternatively, the second glass composition comprises at most about 85 mol % $SiO_2$, at most about 80 mol % $SiO_2$, at most about 77 mol % $SiO_2$, at most about 75 mol % $SiO_2$, or at most about 70 mol % $SiO_2$. Additionally, or alternatively, the second glass composition comprises at least about 1 mol % $Al_2O_3$, at least about 2 mol % $Al_2O_3$, at least about 5 mol % $Al_2O_3$, or at least about 9 mol % $Al_2O_3$. Additionally, or alternatively, the second glass composition comprises at most about 15 mol % $Al_2O_3$, at most about 11 mol % $Al_2O_3$, at most about 5 mol % $Al_2O_3$, or at most about 3 mol % $Al_2O_3$. Additionally, or alternatively, the second glass composition comprises at least about 1 mol % $B_2O_3$, at least about 5 mol % $B_2O_3$, or at least about 9 mol % $B_2O_3$. Additionally, or alternatively, the second glass composition comprises at most about 20 mol % $B_2O_3$, at most about 16 mol % $B_2O_3$, or at most about 10 mol % $B_2O_3$. Additionally, or alternatively, the second glass composition comprises at least about 0.01 mol % $P_2O_5$ or at least about 0.1 mol % $P_2O_5$. Additionally, or alternatively, the second glass composition comprises at most about 1 mol % $P_2O_5$.

In some embodiments, the second glass composition comprises an alkali metal oxide selected from the group consisting of $Li_2O$, $Na_2O$, $K_2O$, and combinations thereof. For example, the second glass composition comprises at least about 1 mol % $Na_2O$, or at least about 2 mol % $Na_2O$. Additionally, or alternatively, the second glass composition comprises at most about 15 mol % $Na_2O$, at most about 11 mol % $Na_2O$, or at most about 5 mol % $Na_2O$. Additionally, or alternatively, the second glass composition comprises from about 0.1 mol % to about 6 mol % $K_2O$, from about 0.1 mol % to about 1 mol % $K_2O$, or from about 2 mol % to about 6 mol % $K_2O$. Additionally, or alternatively, the second glass composition comprises from about 5 mol % to about 15 mol % $Li_2O$, or from about 10 mol % to about 15 mol % $Li_2O$. In some embodiments, the second glass composition is substantially free of alkali metal. For example, the second glass composition comprises at most about 0.01 mol % alkali metal oxide. In other embodiments, the second glass composition comprises from about 2 mol % to about 15 mol % alkali metal oxide.

In some embodiments, the second glass composition comprises an alkaline earth oxide selected from the group consisting of MgO, CaO, SrO, BaO, and combinations thereof. For example, the second glass composition comprises at least about 0.1 mol % MgO, at least about 1 mol % MgO, at least about 3 mol % MgO, at least about 5 mol % MgO, or at least about 10 mol % MgO. Additionally, or alternatively, the second glass composition comprises at most about 15 mol % MgO, at most about 10 mol % MgO, at most about 5 mol % MgO, or at most about 1 mol % MgO. Additionally, or alternatively, the second glass composition comprises at least about 0.1 mol % CaO, at least about 1 mol % CaO, at least about 3 mol % CaO, at least about 5 mol % CaO, or at least about 7 mol % CaO. Additionally, or alternatively, the second glass composition comprises at most about 10 mol % CaO, at most about 7 mol % CaO, at most about 5 mol % CaO, at most about 3 mol % CaO, or at most about 1 mol % CaO. In some embodiments, the second glass composition comprises from about 1 mol % to about 25 mol % alkaline earth oxide.

In some embodiments, the second glass composition comprises one or more additional components including, for example $SnO_2$, $Sb_2O_3$, $As_2O_3$, $Ce_2O_3$, Cl (e.g., derived from KCl or NaCl), Br, F, $ZrO_2$, or $Fe_2O_3$.

TABLE 1

Exemplary Glass Compositions

| | 1 | 2 | 3 | 4 | 5 | 6 | 7 |
|---|---|---|---|---|---|---|---|
| $SiO_2$ | 76.33 | 72.12 | 54.03 | 45.61 | 60.53 | 52.83 | 73.7 |
| $Al_2O_3$ | 7.17 | 9.15 | 15.92 | 21.37 | 12.35 | 17.01 | 6.83 |
| $B_2O_3$ | 4.05 | 4.16 | 8.13 | 7.07 | 1.99 | 5.2 | |
| $P_2O_5$ | | | 3.18 | 4.92 | 0.0244 | 2.517 | |
| $Na_2O$ | 12.18 | 9.88 | 14.7 | 15.73 | 13.94 | 14.839 | 12.01 |
| $K_2O$ | 0.01 | 2.53 | 3.62 | 0.006 | 3.67 | 1.752 | 2.74 |
| $Li_2O$ | | | | | | | |
| MgO | 0.01 | 0.03 | 0.0033 | 0.0055 | 0.6046 | 0.31 | 4.52 |
| CaO | 0.04 | 0.02 | 0.018 | 0.0246 | 0.0221 | 0.03 | |
| BaO | | | | 0.0013 | 0.0041 | | |
| ZnO | | 1.9 | 0.002 | 4.64 | 6.14 | 5.403 | |
| $SnO_2$ | 0.2 | 0.2 | 0.0367 | 0.3208 | 0.1453 | 0.308 | 0.19 |
| $ZrO_2$ | | | 0.0544 | 0.0334 | 0.0267 | 0.026 | |
| $CeO_2$ | | | 0.2179 | | | | |
| $MnO_2$ | | | 0.0003 | | | | |
| $TiO_2$ | | | 0.0085 | | 0.0035 | | |
| $Fe_2O_3$ | | | 0.0089 | 0.0081 | 0.009 | 0.008 | |
| $Sb_2O_3$ | | | 0.002 | 0.0782 | 0.0666 | 0.072 | |

| | 8 | 9 | 10 | 11 | 12 | 13 | 14 |
|---|---|---|---|---|---|---|---|
| $SiO_2$ | 78.67 | 77.9 | 77.4 | 77 | 76.6 | 77 | 77 |
| $Al_2O_3$ | 1.95 | 3.42 | 7 | 7 | 7 | 7 | 7 |
| $B_2O_3$ | 14.19 | 9.82 | | | | | |
| $P_2O_5$ | | | | | | | |
| $Na_2O$ | 3.64 | 7.01 | 10 | 10.2 | 10.4 | 5.3 | 10.4 |
| $K_2O$ | 0.01 | | 0.1 | 0.3 | 0.5 | 5.2 | 0.1 |
| $Li_2O$ | | | | | | | |
| MgO | 0.02 | 0.09 | 4.8 | 4.8 | 4.8 | 4.8 | 2.8 |
| CaO | 0.85 | 1.64 | 0.5 | 0.5 | 0.5 | 0.5 | 2.5 |
| BaO | 0.58 | | | | | | |
| ZnO | | | | | | | |
| $SnO_2$ | 0.07 | | 0.2 | 0.2 | 0.2 | 0.2 | 0.2 |
| $ZrO_2$ | | | | | | | |
| $CeO_2$ | | | | | | | |
| $MnO_2$ | | | | | | | |
| $TiO_2$ | | | | | | | |
| $Fe_2O_3$ | | | | | | | |
| $Sb_2O_3$ | | | | | | | |

| | 15 | 16 | 17 | 18 | 19 | 20 | 21 |
|---|---|---|---|---|---|---|---|
| $SiO_2$ | 77 | 77 | 77 | 77 | 76.5 | 76.5 | 75 |
| $Al_2O_3$ | 6.5 | 6.5 | 6.5 | 6.5 | 6.5 | 6.5 | 8 |
| $B_2O_3$ | | | | | | | |
| $P_2O_5$ | | | | | | | |
| $Na_2O$ | 10.7 | 11 | 10.4 | 9.8 | 8 | 7 | 6 |
| $K_2O$ | 0.1 | 0.1 | 0.1 | 0.1 | 0.1 | 0.1 | 0.1 |
| $Li_2O$ | | | | | | | |
| MgO | 2.5 | 2.7 | 3 | 3.3 | 4.5 | 5 | 5.5 |
| CaO | 3 | 2.5 | 2.8 | 3.1 | 4.2 | 4.7 | 5.2 |
| BaO | | | | | | | |
| ZnO | | | | | | | |
| $SnO_2$ | 0.2 | 0.2 | 0.2 | 0.2 | 0.2 | 0.2 | 0.2 |
| $ZrO_2$ | | | | | | | |
| $CeO_2$ | | | | | | | |
| $MnO_2$ | | | | | | | |
| $TiO_2$ | | | | | | | |
| $Fe_2O_3$ | | | | | | | |
| $Sb_2O_3$ | | | | | | | |

TABLE 1-continued

Exemplary Glass Compositions

| | 22 | 23 | 24 | 25 | 26 | 27 | 28 |
|---|---|---|---|---|---|---|---|
| $SiO_2$ | 70 | 72 | 68 | 70 | 72 | 68 | 70 |
| $Al_2O_3$ | 11 | 9 | 11 | 9 | 7 | 9 | 9 |
| $B_2O_3$ | | | | | | | |
| $P_2O_5$ | | | | | | | |
| $Na_2O$ | 5 | 5 | 5 | 5 | 5 | 5 | 3 |
| $K_2O$ | | | | | | | |
| $Li_2O$ | | | | | | | |
| MgO | 7 | 7 | 7 | 7 | 7 | 13 | 13 |
| CaO | 7 | 7 | 9 | 9 | 9 | 5 | 5 |
| BaO | | | | | | | |
| ZnO | | | | | | | |
| $SnO_2$ | 0.2 | 0.2 | 0.2 | 0.2 | 0.2 | 0.2 | 0.2 |
| $ZrO_2$ | | | | | | | |
| $CeO_2$ | | | | | | | |
| $MnO_2$ | | | | | | | |
| $TiO_2$ | | | | | | | |
| $Fe_2O_3$ | | | | | | | |
| $Sb_2O_3$ | | | | | | | |

| | 29 | 30 | 31 | 32 | 33 | 34 | 35 |
|---|---|---|---|---|---|---|---|
| $SiO_2$ | 72 | 68 | 70 | 72 | 68 | 68 | 70 |
| $Al_2O_3$ | 7 | 9 | 7 | 11 | 7 | 9 | 7 |
| $B_2O_3$ | | | | | | | |
| $P_2O_5$ | | | | | | | |
| $Na_2O$ | 3 | 3 | 3 | 5 | 3 | 1 | 1 |
| $K_2O$ | | | | | | | |
| $Li_2O$ | | | | | | | |
| MgO | 13 | 13 | 13 | 7 | 13 | 13 | 13 |
| CaO | 5 | 7 | 7 | 5 | 9 | 9 | 9 |
| BaO | | | | | | | |
| ZnO | | | | | | | |
| $SnO_2$ | 0.2 | 0.2 | 0.2 | 0.2 | 0.2 | 0.2 | 0.2 |
| $ZrO_2$ | | | | | | | |
| $CeO_2$ | | | | | | | |
| $MnO_2$ | | | | | | | |
| $TiO_2$ | | | | | | | |
| $Fe_2O_3$ | | | | | | | |
| $Sb_2O_3$ | | | | | | | |

| | 36 | 37 | 38 | 39 | 40 | 41 | 42 |
|---|---|---|---|---|---|---|---|
| $SiO_2$ | 72 | 70 | 72 | 68 | 72 | 70 | 72 |
| $Al_2O_3$ | 11 | 11 | 9 | 11 | 11 | 11 | 9 |
| $B_2O_3$ | | | | | | | |
| $P_2O_5$ | | | | | | | |
| $Na_2O$ | 3 | 3 | 3 | 3 | 1 | 1 | 1 |
| $K_2O$ | | | | | | | |
| $Li_2O$ | | | | | | | |
| MgO | 7 | 7 | 7 | 13 | 7 | 13 | 13 |
| CaO | 7 | 9 | 9 | 5 | 9 | 5 | 5 |
| BaO | | | | | | | |
| ZnO | | | | | | | |
| $SnO_2$ | 0.2 | 0.2 | 0.2 | 0.2 | 0.2 | 0.2 | 0.2 |
| $ZrO_2$ | | | | | | | |
| $CeO_2$ | | | | | | | |
| $MnO_2$ | | | | | | | |
| $TiO_2$ | | | | | | | |
| $Fe_2O_3$ | | | | | | | |
| $Sb_2O_3$ | | | | | | | |

| | 43 | 44 | 45 | 46 |
|---|---|---|---|---|
| $SiO_2$ | 68 | 70 | 72 | 80 |
| $Al_2O_3$ | 11 | 9 | 7 | 5 |
| $B_2O_3$ | | | | |
| $P_2O_5$ | | | | 0.2 |
| $Na_2O$ | 1 | 1 | 1 | |
| $K_2O$ | | | | 4 |
| $Li_2O$ | | | | 10 |
| MgO | 13 | 13 | 13 | |
| CaO | 7 | 7 | 7 | |
| BaO | | | | |
| ZnO | | | | |
| $SnO_2$ | 0.2 | 0.2 | 0.2 | |
| $ZrO_2$ | | | | |
| $CeO_2$ | | | | |
| $MnO_2$ | | | | |
| $TiO_2$ | | | | |
| $Fe_2O_3$ | | | | |
| $Sb_2O_3$ | | | | |

In some embodiments, the glass article described herein can be used as a first pane or ply in a glass-polymer laminate. For example, the glass-polymer laminate comprises the first pane and a second pane laminated to each other with a polymeric interlayer disposed therebetween. In some embodiments, the second pane comprises a second glass article as described herein. The second glass article can have the same or a different configuration than the glass article of the first pane. In other embodiments, the second pane comprises a single-layer glass sheet (e.g., an annealed glass sheet, a thermally strengthened glass sheet, or a chemically strengthened glass sheet) or a polymeric sheet (e.g., a polycarbonate sheet). The interlayer comprises poly vinyl butyral (PVB) or another suitable polymeric material.

In various embodiments, the glass articles described herein can be incorporated into vehicles such as automobiles, boats, and airplanes (e.g., glazing such as windshields, windows or sidelites, mirrors, pillars, side panels of a door, headrests, dashboards, consoles, or seats of the vehicle, or any portions thereof), architectural fixtures or structures (e.g., internal or external walls of building, and flooring), appliances (e.g., a refrigerator, an oven, a stove, a washer, a dryer, or another appliance), consumer electronics (e.g., televisions, laptops, computer monitors, and handheld electronics such as mobile phones, tablets, and music players), furniture, information kiosks, retail kiosks, and the like. For example, the glass articles described herein can be used in display (e.g., cover glass or glass backplane) and/or touch panel applications, whereby the glass article can enable a display and/or touch panel with desired attributes of the glass article such as curved shape, mechanical strength, etc. In some embodiments, such displays can comprise a micro-LED, an OLED, an LCD, a plasma cell, an electroluminescent (EL) cell array, a quantum dot, or another suitable element configured to emit radiation. In other embodiments, such displays can comprise projection displays. For example, the glass article comprises light scattering features for displaying an image projected thereon. In some embodiments, the glass articles described herein can be used in a case or housing of an appliance or a consumer or commercial electronic device.

In some embodiments, a display comprising a glass article described herein is at least partially transparent to visible light. Ambient light (e.g., sunlight) can make the display image difficult or impossible to see when projected on or generated by such a display. In some embodiments, the display, or portion thereof on which the display image is projected or from which the display image is emitted, can include a darkening material such as, for example, an inorganic or organic photochromic or electrochromic material, a suspended particle device, and/or a polymer dispersed liquid crystal. Thus, the transparency of the display can be adjusted to increase the contrast of the display image. For example, the transparency of the display can be reduced in bright sunlight by darkening the display to increase the contrast of the display image. The adjustment can be controlled automatically (e.g., in response to exposure of the display surface to a particular wavelength of light, such as ultraviolet light, or in response to a signal generated by a light detector, such as a photoeye) or manually (e.g., by a viewer).

The glass articles described herein can be used for a variety of applications including, for example, for cover glass or glass backplane applications in consumer or commercial electronic devices including, for example, LCD, LED, microLED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications including, for example, glazing and displays; for commercial or household appliance applications; for lighting or signage (e.g., static or dynamic signage) applications; or for transportation applications including, for example, rail and aerospace applications.

EXAMPLES

Various embodiments will be further clarified by the following examples.

Example 1

A glass article with the general configuration shown in FIG. 1 is formed. At least one layer (the tinted layer) of the glass article is formed from a glass composition shown in Table 2. The amounts of the various components are given in Table 2 as mol % on an oxide basis. The tinting agent of each glass composition includes the one or more components listed under the "Tinting Agent" heading in Table 2. The glass article has the color of the tinted layer given under the "Color" heading in Table 2.

TABLE 2

Exemplary Tinted Layer Compositions and Colors

|  | 1-1 | 1-2 | 1-3 | 1-4 | 1-5 | 1-6 | 1-7 |
|---|---|---|---|---|---|---|---|
| $SiO_2$ | 80 | 80 | 80 | 80 | 80 | 80 | 80 |
| $Al_2O_3$ | 5 | 5 | 5 | 5 | 5 | 5 | 5 |
| $Li_2O$ | 11 | 11 | 11 | 11 | 11 | 11 | 11 |
| $K_2O$ | 4 | 4 | 4 | 4 | 4 | 4 | 4 |
| $P_2O_5$ | 0.21 | 0.21 | 0.21 | 0.21 | 0.21 | 0.21 | 0.21 |
| Tinting Agent | | | | | | | |
| $Co_3O_4$ | 0.05 | | | | | | |
| $Cr_2O_3$ | | 0.1 | | | | | |
| CuO | | | 0.5 | | | | |
| $MnO_2$ | | | | 0.5 | | | |
| $Fe_2O_3$ | | | | | 0.5 | | |
| NiO | | | | | | 0.5 | |
| $WO_3$ | | | | | | | 1.5 |
| $MoO_3$ | | | | | | | |
| Au | | | | | | | |
| SnO | | | | | | | |
| $SnO_2$ | | | | | | | 0.1 |

TABLE 2-continued

Exemplary Tinted Layer Compositions and Colors

| Color | | | | | | | |
|---|---|---|---|---|---|---|---|
|  | blue | green | blue | pink | green | brown | beige |
|  | 1-8 | 1-9 | 1-10 | 1-11 | 1-12 | 1-13 | 1-14 |
| $SiO_2$ | 80 | 80 | 80 | 80 | 80 | 80 | 80 |
| $Al_2O_3$ | 5 | 5 | 5 | 5 | 5 | 5 | 5 |
| $Li_2O$ | 11 | 11 | 11 | 11 | 11 | 11 | 11 |
| $K_2O$ | 4 | 4 | 4 | 4 | 4 | 4 | 4 |
| $P_2O_5$ | 0.21 | 0.21 | 0.21 | 0.21 | 0.21 | 0.21 | 0.21 |
| Tinting Agent | | | | | | | |
| $Co_3O_4$ | | | | | 0.02 | 0.02 | |
| $Cr_2O_3$ | | | | 0.1 | 0.1 | | |
| CuO | | | 0.8 | 0.8 | | | |
| $MnO_2$ | | | | | | 2 | 2 |
| $Fe_2O_3$ | | | | | | | |
| NiO | | | | | | | |
| $WO_3$ | | | | | | | |
| $MoO_3$ | 1.5 | | | | | | |
| Au | | | | | | | 0.003 |
| SnO | | 1 | | | | | |
| $SnO_2$ | 0.1 | | 0.1 | 0.1 | 0.1 | 0.1 | 0.1 |
| Color | | | | | | | |
|  | blue | red | green | blue | blue | brown | brown |

|  | 1-15 |
|---|---|
| $SiO_2$ | 80 |
| $Al_2O_3$ | 5 |
| $Li_2O$ | 11 |
| $K_2O$ | 4 |
| $P_2O_5$ | 0.21 |
| Tinting Agent | |
| $Co_3O_4$ | |
| $Cr_2O_3$ | |
| CuO | |
| $MnO_2$ | |
| $Fe_2O_3$ | |
| NiO | |
| $WO_3$ | |
| $MoO_3$ | |
| Au | 0.007 |
| SnO | |
| $SnO_2$ | 0.1 |
| Color | |
|  | red |

Example 2

A glass article with the general configuration shown in FIG. 1 is formed. At least one layer (the tinted layer) of the glass article is formed from a glass composition shown in Table 3. The amounts of the various components are given in Table 3 as mol % on an oxide basis. The tinting agent of each glass composition includes the one or more components listed under the "Tinting Agent" heading in Table 3. The glass article has the color of the tinted layer given under the "Color" heading in Table 3.

TABLE 3

Exemplary Tinted Layer Compositions and Colors

|  | 2-1 | 2-2 | 2-3 | 2-4 | 2-5 | 2-6 | 2-7 |
|---|---|---|---|---|---|---|---|
| $SiO_2$ | 66 | 66 | 66 | 64 | 64 | 64 | 64 |
| $Al_2O_3$ | 10 | 10 | 10 | 12 | 12 | 12 | 12 |

TABLE 3-continued

Exemplary Tinted Layer Compositions and Colors

|  |  |  |  |  |  |  |  |
|---|---|---|---|---|---|---|---|
| $B_2O_3$ | 1 | 1 | 1 | 4 | 4 | 4 | 4 |
| $Na_2O$ | 14 | 14 | 14 | 15 | 15 | 15 | 15 |
| $K_2O$ | 2 | 2 | 2 | 3 | 3 | 3 | 3 |
| MgO | 6 | 6 | 6 | 2 | 2 | 2 | 2 |
| CaO | 1 | 1 | 1 | | | | |
| $ZrO_2$ | 0.01 | 0.01 | 0.01 | | | | |
| Se | | | | | | | |
| Tinting Agent | | | | | | | |
| $Cr_2O_3$ | 0.0123 | 0.0123 | 0.0123 | | 0.0102 | 0.0123 | 0.0123 |
| $Fe_2O_3$ | 0.2 | 0.5 | 0.7 | 0.5 | | | 0.2 |
| $Co_3O_4$ | 0.0031 | 0.0031 | 0.0031 | | 0.0026 | 0.0031 | 0.0031 |
| NiO | 0.15 | 0.15 | 0.15 | | 0.125 | 0.15 | 0.15 |
| $TiO_2$ | | | | | | | |
| $V_2O_5$ | | | | | | | |
| $MnO_2$ | | | | | | | |
| CuO | | | | | | | |
| $SnO_2$ | 0.2 | 0.2 | 0.2 | 0.1 | 0.1 | 0.1 | 0.1 |
| Color | | | | Green | Purple | Purple | Purple |

| | 2-8 | 2-9 | 2-10 | 2-11 | 2-12 | 2-13 | 2-14 |
|---|---|---|---|---|---|---|---|
| $SiO_2$ | 64 | 64 | 64 | 64 | 64 | 64 | 64 |
| $Al_2O_3$ | 12 | 12 | 12 | 12 | 12 | 12 | 12 |
| $B_2O_3$ | 4 | 4 | 4 | 4 | 4 | 4 | 4 |
| $Na_2O$ | 15 | 15 | 15 | 15 | 15 | 15 | 15 |
| $K_2O$ | 3 | 3 | 3 | 3 | 3 | 3 | 3 |
| MgO | 2 | 2 | 2 | 2 | 2 | 2 | 2 |
| CaO | | | | | | | |
| $ZrO_2$ | | | | | | | |
| Se | | | | | | | |
| Tinting Agent | | | | | | | |
| $Cr_2O_3$ | 0.0528 | 0.0528 | 0.1 | 0.1 | 0.1 | | 0.05 |
| $Fe_2O_3$ | 0.019 | 0.2 | 0.2 | 0.2 | 0.2 | | |
| $Co_3O_4$ | 0.0114 | 0.0114 | 0.0114 | | 0.012 | | |
| NiO | 0.038 | 0.038 | 0.038 | | | | |
| $TiO_2$ | | | | 1 | 1 | | |
| $V_2O_5$ | | | | | | 0.05 | |
| $MnO_2$ | | | | | | | |
| CuO | | | | | | | |
| $SnO_2$ | 0.1 | 0.1 | 0.1 | 0.1 | 0.1 | 0.1 | 0.1 |
| Color | Green | Blue | Green | Green | Green | Light Green | Yellow-Green |

| | 2-15 | 2-16 | 2-17 | 2-18 | 2-19 | 2-20 | 2-21 |
|---|---|---|---|---|---|---|---|
| $SiO_2$ | 64 | 64 | 64 | 64 | 64 | 64 | 64 |
| $Al_2O_3$ | 12 | 12 | 12 | 12 | 12 | 12 | 12 |
| $B_2O_3$ | 4 | 4 | 4 | 4 | 4 | 4 | 4 |
| $Na_2O$ | 15 | 15 | 15 | 15 | 15 | 15 | 15 |
| $K_2O$ | 3 | 3 | 3 | 3 | 3 | 3 | 3 |
| MgO | 2 | 2 | 2 | 2 | 2 | 2 | 2 |
| CaO | | | | | | | |
| $ZrO_2$ | | | | | | | |
| Se | | | | | | 0.1 | |
| Tinting Agent | | | | | | | |
| $Cr_2O_3$ | | | | | | | |
| $Fe_2O_3$ | | 0.05 | | | | | 0.05 |
| $Co_3O_4$ | | | 0.03 | | | | 0.03 |
| NiO | | | | 0.1 | | | 0.1 |
| $TiO_2$ | | | | | | | |
| $V_2O_5$ | | | | | | | |
| $MnO_2$ | 0.1 | | | | | | |
| CuO | | | | | 0.1 | | |
| $SnO_2$ | 0.1 | 0.1 | 0.1 | 0.1 | 0.1 | 0.1 | 0.1 |
| Color | Water White | Light Blue-Green | Blue | Purple | Pale Blue | Orange | Blue |

It will be apparent to those skilled in the art that various modifications and variations can be made without departing from the spirit or scope of the invention. Accordingly, the invention is not to be restricted except in light of the attached claims and their equivalents.

What is claimed is:

1. A laminated glass article comprising:
  a glass core layer comprising at least one alkali metal and a tinting agent, wherein the glass core layer is not an opal glass, wherein the tinting agent is configured to impart a visible color to the glass core layer, wherein the glass core layer comprises:
    greater than or equal to 70 mol % $SiO_2$;
    greater than or equal to 1 mol % $B_2O_3$;
    less than or equal to 6 mol % $K_2O$;
    greater than or equal to 5 mol % $Na_2O$; and
    a liquidus viscosity of greater than or equal to 100 kP;
  a first glass cladding layer fused to a first surface of the core layer and substantially free of alkali metals; and
  a second glass cladding layer fused to a second surface of the core layer and substantially free of alkali metals;
  wherein
    the tinting agent comprises a transition metal selected from the group consisting of Cr, Ni, Co, Au, Ag, and Cu, and combinations thereof and a redox agent comprising Sn atoms.

2. The laminated glass article of claim 1, wherein the tinting agent further comprises at least one of a phosphorescent material or a fluorescent material.

3. The laminated glass article of claim 1, wherein the glass core layer comprises an ion exchangeable glass composition.

4. The laminated glass article of claim 1, wherein each of the first glass cladding layer and the second glass cladding layer has a lower coefficient of thermal expansion than the glass core layer.

5. The laminated glass article of claim 1, wherein at least one of the glass core layer, the first glass cladding layer, or the second glass cladding layer comprises a glass-ceramic material.

6. The laminated glass article of claim 1, the glass article having an average transmittance of at least about 70% over a wavelength range of about 400 nm to about 750 nm.

7. The laminated glass article of claim 1, wherein the tinting agent comprises a combination of Ni and Co.

8. The laminated glass article of claim 1, wherein the transition metal is Cu.

9. The laminated glass article of claim 1, wherein the tinting agent further comprises at least one of:
  b) a rare earth element selected from the group consisting of Pr, Sm, Eu, Gd, Tb, Dy, Ho, Er, Nd, Tm, Yb, Lu, U, and combinations thereof and a redox agent comprising Sn atoms; or
  c) atoms selected from Se and Cd, S and Cd or Se, S, and Cd and colloidal compounds thereof; or
  d) metallic colloids of a metal selected from the group consisting of Ag, Au, Cu, Pt, and combinations thereof.

* * * * *

UNITED STATES PATENT AND TRADEMARK OFFICE
CERTIFICATE OF CORRECTION

PATENT NO. : 11,472,730 B2
APPLICATION NO. : 15/578147
DATED : October 18, 2022
INVENTOR(S) : Heather Debra Boek et al.

It is certified that error appears in the above-identified patent and that said Letters Patent is hereby corrected as shown below:

On the Title Page

On the page 2, in Column 2, under "Other Publications", Line 4, delete "ated" and insert -- dated --.

Signed and Sealed this
Thirtieth Day of January, 2024

Katherine Kelly Vidal
*Director of the United States Patent and Trademark Office*